United States Patent
Munoz et al.

(10) Patent No.: US 9,766,094 B2
(45) Date of Patent: Sep. 19, 2017

(54) SMART LOWER END

(71) Applicant: REME, L.L.C., Conroe, TX (US)

(72) Inventors: Brad Munoz, Houston, TX (US); Benjamin Jennings, Houston, TX (US); Abraham Erdos, Houston, TX (US); David Erdos, Houston, TX (US); Kenneth Miller, Houston, TX (US); Joshua Carter, Conroe, TX (US); James Mathieson, Conroe, TX (US)

(73) Assignee: REME, L.L.C., Conroe, TX (US)

( * ) Notice: Subject to any disclaimer, the term of this patent is extended or adjusted under 35 U.S.C. 154(b) by 0 days.

(21) Appl. No.: 14/882,720

(22) Filed: Oct. 14, 2015

(65) Prior Publication Data

US 2016/0109267 A1 Apr. 21, 2016

Related U.S. Application Data (60) Provisional application No. 62/064,837, filed on Oct. 16, 2014.

(51) Int. Cl.
| | |
|---|---|
| *G01V 3/00* | (2006.01) |
| *G01D 5/22* | (2006.01) |
| *G01V 3/30* | (2006.01) |
| *E21B 47/18* | (2012.01) |
| *G01L 19/00* | (2006.01) |
| *G01D 3/08* | (2006.01) |

(52) U.S. Cl.
CPC ......... *G01D 5/2291* (2013.01); *E21B 47/182* (2013.01); *E21B 47/187* (2013.01); *G01L 19/0092* (2013.01); *G01V 3/30* (2013.01); *G01D 3/08* (2013.01)

(58) Field of Classification Search
CPC ....... G01D 5/2291; G01V 3/30; E21B 47/187
USPC ............................................ 324/207.18, 338
See application file for complete search history.

(56) References Cited

U.S. PATENT DOCUMENTS

| | | | |
|---|---|---|---|
| 4,647,853 A | 3/1987 | Cobern | |
| 5,586,084 A | 12/1996 | Barron et al. | |
| 5,818,352 A | 10/1998 | McClure | |
| 5,942,892 A * | 8/1999 | Li | H01F 7/1844 137/554 |
| 6,019,346 A * | 2/2000 | Miller | F16K 31/005 137/625.28 |
| 6,179,066 B1 | 1/2001 | Nasr et al. | |
| 7,966,866 B2 * | 6/2011 | Hansma | A61B 5/0053 73/81 |
| 9,133,664 B2 * | 9/2015 | MacDonald | E21B 47/18 |
| 2002/0159333 A1 | 10/2002 | Hahn et al. | |

(Continued)

OTHER PUBLICATIONS

International Searching Authority; PCT/US2015/055455; International Search Report and The Written Opinion; Mailed Feb. 2, 2016.

*Primary Examiner* — Reena Aurora
(74) *Attorney, Agent, or Firm* — Morgan, Lewis & Bockius LLP (57) ABSTRACT

A smart lower end system that can detect multiple events and failures during the generation of pressure pulses by a pulser is disclosed. Pulser failures may occur if the pilot valve fails to fully close or open, if the signal shaft fails to move and close pilot valve orifice, or if movement of the pilot valve or signal shaft is restricted. The components of the smart lower end system may cycle between sleep and wake states to allow for low power operation.

29 Claims, 5 Drawing Sheets

(56) References Cited

U.S. PATENT DOCUMENTS

2009/0308657 A1    12/2009  Clark et al.
2010/0155138 A1     6/2010  Kuckes
2013/0048379 A1*    2/2013  MacDonald .......... E21B 47/187
                                                      175/38

* cited by examiner

SMART LOWER END

BACKGROUND

1. Field of the Invention

The present invention relates to measurement-while-drilling and logging-while-drilling technologies used in the oil and gas industry, and more specifically to downhole mud pulse telemetry assemblies and downhole health monitoring systems.

2. Description of the Related Art

In downhole drilling operations, tools are lowered deep into the ground to perform various functions, such as drilling, measuring related data, and logging the data. Measurement-while-drilling (MWD) allows for the surface acquisition of downhole data during drilling. Boreholes may be thousands of feet in length, and may encompass different geological rock formations. Due to the length of the drill string, communication between surface equipment and downhole tools is limited during drilling applications. In modern measurement-while-drilling systems, information is telemetered to the surface primarily through either mud pulse, electromagnetic, or acoustic telemetry systems. These telemetry systems may transmit data regarding the location, orientation, and inclination of the drill string, the type of rock formation that is being drilled, the rotational speed of the drill string, etc.

Mud pulse telemetry systems are commonly used to communicate between a downhole tool and the uphole operator during drilling applications. Data to be transmitted is encoded into a predetermined encoding scheme. In mud pulse telemetry systems, a pulser is used to generate surges, or pulses, in the drilling fluid, generically known as mud, which is flowing through the drill string. The pulser generates pressure pulses by constricting a flow path in the fluid in the borehole. The constrictions are created and then released in the drill string with a specific timing to generate patterns to encode data based on the timing of the pressure pulses.

A common type of pulser is a hydraulic, or tensor, pulser. In a hydraulic pulser, pulser driver circuitry activates a solenoid. The solenoid actuation causes a pilot valve, which may be a poppet valve, to open, which causes a signal shaft to move and create another restriction at the bottom of the tool. This restriction causes a pulse to be generated through the fluid.

The pressure pulses propagate through the fluid from the downhole tool to the surface. Pressure sensitive transducers at the surface can detect the encoded pulses and decode the pulses to arrive at the original data. The real time capture and transmission of data allows operators at the surface to make real time decisions regarding drilling operations. The mud pulse telemetry communication may be bidirectional, and surface equipment may generate pulses that are telemetered downhole to steer or control a downhole drill string.

If any of these elements fail, the pressure pulse will either be distorted or not generated. Current systems have open loop monitoring capabilities and can only monitor whether the solenoid circuitry applied the appropriate power to activate the solenoid. Beyond this, current systems cannot determine if the solenoid, the pilot valve, or the signal shaft individually fails. Further, current systems cannot determine if a pulse was actually generated by the mud pulse telemetry assembly.

SUMMARY OF THE INVENTION

In accordance with the present invention, the problems above are addressed with a smart lower end system that can detect multiple events and failures during the generation of pressure pulses by a pulser. Pulser failures may occur if the pilot valve fails to fully close or open, if the signal shaft fails to move and close the pilot orifice, or if movement of the pilot or signal shaft is restricted. The components of the smart lower end system may cycle between sleep and wake states to allow for low power operation.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 1:
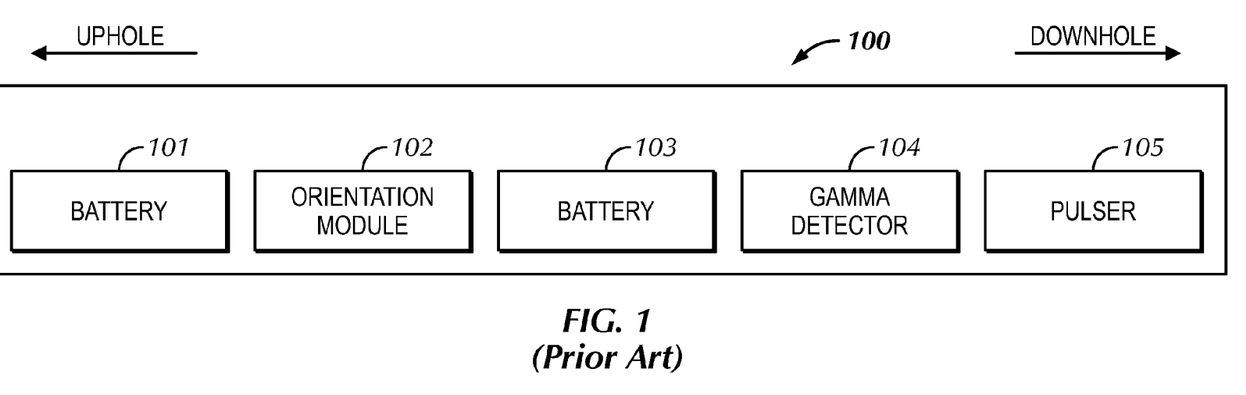
FIG. 1 is a schematic view of a typical MWD tool configuration.

FIG. 1 shows a typical battery-powered downhole measurement tool 100. The tool 100 is typically lowered into a well through the inner diameter of the drill pipe string and set into a mule shoe sub, where the uphole portion of the tool 100 includes battery 101 and the downhole portion of the tool 100 includes the pulser 105. The tool 100 additionally includes an orientation module 102 to determine the orientation of the tool, and a gamma ray detector 104 which is able to measure naturally occurring radiation emitted from rock formations downhole. Batteries 101 and 103 act as power supplies for the components of tool 100. The pulser 105 creates restrictions in the drill pipe that subsequently generate pressure pulses that propagate to the surface.

Figure 2:
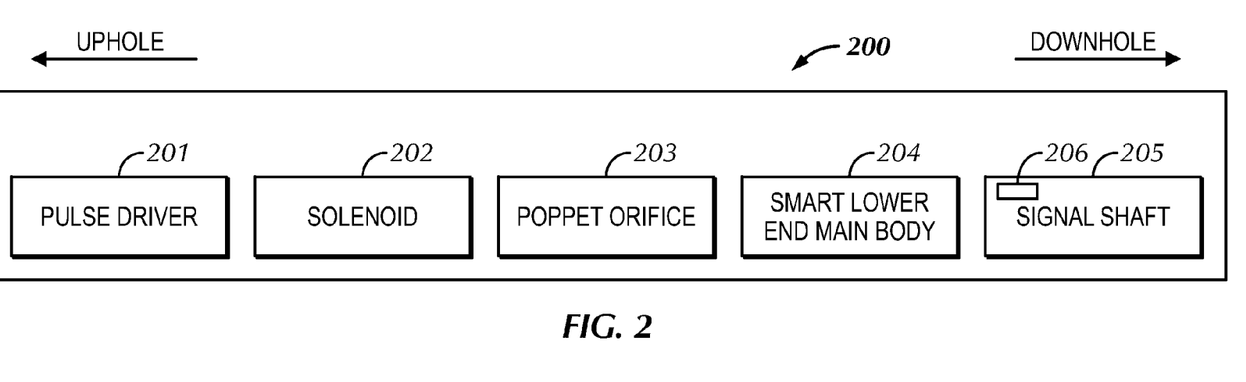
FIG. 2 is a schematic view of one exemplary pulser tool configuration that practices the present invention.

As shown in FIG. 2, one possible embodiment of a pulser 200 practicing the present invention may have several discrete sections, including the pulser driver 201, solenoid 202, poppet or pilot orifice 203, smart lower end main body 204, and signal shaft 205. The pulser driver circuitry 201 activates the solenoid 202, which then opens a pilot valve. The pilot valve controls a pressure or flow feed. The differential pressure created after the pilot valve opens causes the signal shaft 205 to actuate, and the pilot orifice 203 covered by the pilot valve is closed. The actuation of the signal shaft 205 creates a restriction in the main valve in the fluid flow at the bottom of the tool. This restriction in the mud flow creates a pressure pulse. Thus, the actuation of the solenoid 202 starts the pressure pulse generation. In another embodiment, a motor (not shown) may be used to move the pilot valve and hydraulically actuate the signal shaft 205 to start pressure pulse generation.

As stated above, a pulser 200 creates distorted pulses when mud is flowing to telemeter data to the surface. However, in certain instances, the pulser 200 may fail to generate a pulse even if mud is flowing and the pulser activates. Failures may occur if the solenoid fails to activate, if the pilot valve fails to fully close or open, or if the signal shaft fails to move and close pilot orifice 203.

Figure 3:
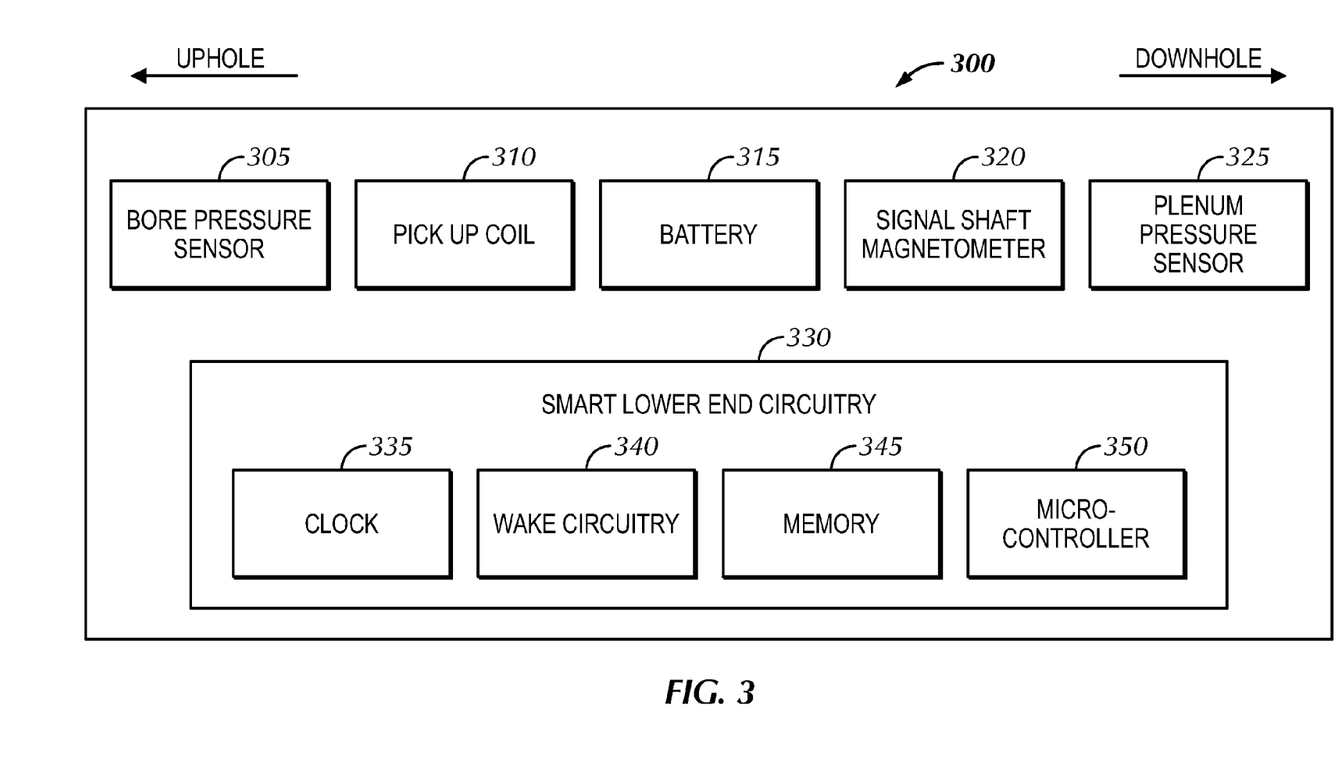
FIG. 3 is a more detailed block diagram of an exemplary smart lower end.

To both detect and isolate faults in the pulser actuation, a smart lower end system includes various sensors. Referring to FIG. 3, four sets of sensors are shown in the embodiment of the smart lower end 300, which corresponds with smart lower end main body 204 shown in FIG. 2: a pick up coil 310 (or a solenoid sense circuit 310), a signal shaft magnetometer 320, a bore pressure sensor 305, and a plenum pressure sensor 325. Other sensors may also be used. The smart lower end 300 also includes a battery 315 to supply power to the other lower end components and smart lower end circuitry 330, which may include a microcontroller 350, a memory 345, a clock 335, and wake circuitry 340. Firmware that controls the pulser 200 may be stored on onboard memory 345 and executed by the microcontroller 350. Memory 345 may also be used to store data acquired from the lower end sensors.

The bore pressure sensor 305 and plenum pressure sensor 325 may be implemented using absolute pressure sensors or a differential pressure sensor. An absolute pressure sensor would measure pressure relative to a vacuum, while a differential pressure sensor measures the pressure difference between two points. A differential pressure sensor may be used to measure the pressure differential between the bore and plenum. The pressure sensors should be adapted for use in high pressure downhole operations.

Because the smart lower end may be electronically isolated from other components of the tool 100 shown in FIG. 1, and because the tool 100 must be designed with a relatively small diameter to allow for its use in downhole operations, battery capacity and power utilization are often critical operating concerns. Battery capacity is generally limited by the physical dimensions of the tool 100, and more specifically by the dimensions of the smart lower end 300. Accordingly, the components on the smart lower end 300 preferably operate at low power. To accomplish this further, the electronics 330 for the smart lower end 300 may operate in sleep and active states. During the sleep state, most of the electronic components are turned off or are kept in a low power state until a time at which they are "awoken" to become active and fully operational.

Figure 4:
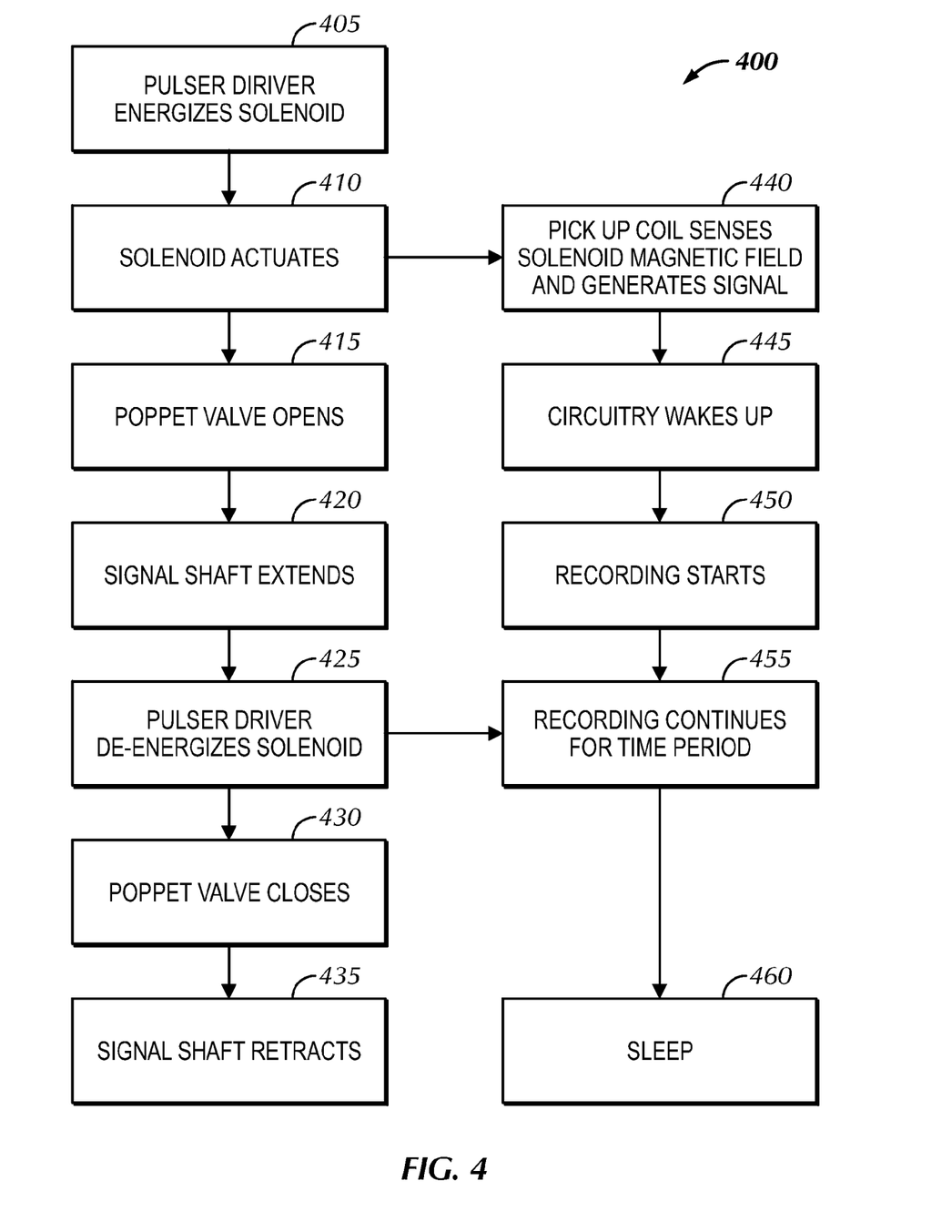
FIG. 4 illustrates an exemplary method of implementing the present invention.

Referring now to FIG. 4, a method 400 of implementing the smart lower end is shown. In the figure, the left column element 405-435 generally represents actions associated with the generation of pressure pulses by the pulser, and the right column elements 440-460 generally represents actions associated with the smart lower end circuitry 330 and related sensors. To start the generation of a pressure pulse, the solenoid 202 energizes after receiving a signal from the pulser driver 201, as shown at 405. At 410, the solenoid actuates. This actuation is the start of the mud telemetry pressure pulse generation and is the trigger to awaken the sensor components and related circuitry on the smart lower end 300.

Generally, solenoids create a highly contained magnetic field with little leakage flux. However, the leakage flux is sufficient to be detectable by the solenoid sense circuit 310. Once the solenoid sense circuit 310 senses a change in the magnetic field of the solenoid 202, as shown at 440, the solenoid sense circuit 310 identifies the actuation of the solenoid 202 and sends a signal to the wake circuitry 340, which, in turn, wakes the other components of smart lower end circuitry 330, as shown at 445. In order to limit power usage, a passive sense coil may be used for solenoid sense circuit 310 instead of a powered magnetometer.

By using a wake signal, the other components of smart lower end circuitry 330 can be used efficiently for logging only during a pressure pulse. Additionally, timing of the solenoid sense circuit 310 can be correlated with measurement-while-drilling parameters of interest, such as shock and vibration, from the pulser monitoring circuitry located in the pulser driver 201, as shown in FIG. 2.

In some embodiments, wake circuitry 340 may be configured to wake periodically, rather than by being triggered by the solenoid sense circuit 310 sensing a change in the magnetic field of solenoid 202. This may be used, for example, in an embodiment of the tool where a motor is used to actuate the pilot valve, rather than a solenoid. This may also be used as a backup if the solenoid sense circuit 310 malfunctions. In such instances, wake circuitry 340 is configured to wake periodically, read various sensors, and determine whether additional logging and recording should be performed. If it is determined that additional logging should not be performed (based on some criteria that indicates that the pulser may not be in operation), then the wake circuitry 340 returns the smart lower end 300 to a sleep state. This limits power usage without requiring a triggering action dependent upon the pick up coil 310 (or a solenoid sense circuit 310). Additional logging is performed only when certain criteria indicating that the pulser may be operating are met. As one example, the pulser will not be in operation at the surface, so one criterion that may be used as a trigger is to check whether the pressure measured at either pressure sensor exceeds a threshold associated with downhole operating pressures. If the pressure sensors detect pressures that exceed 100 psi (a pressure that would typically be seen at 200 foot depth downhole), for example, may act as a trigger for the wake circuitry to begin logging. Pressures detected that are lower than 100 psi may indicate that the tool is at the surface and likely not active, and that logging by the smart lower end 300 is unnecessary.

Once awake, the other lower end sensors will begin measuring and recording data, as shown at 450. Shortly after, the pilot valve opens at 415. When that pilot valve opens, the plenum pressure drops. The pressure difference created by the pilot valve's movement is measured using the plenum pressure sensor 325 and can be used to verify the actuation of the pilot valve. The pressure difference also actuates a hydraulic system that causes the signal shaft 205 to extend, as referenced at 420.

To allow for sensing the axial motion of the signal shaft 205, the signal shaft 205 may be augmented with a magnet 206. The motion of the magnet 206 can be detected and quantified by the signal shaft magnetometer 320, which may be implemented as two or more separate magnetometers to compensate for the changes in the earth's magnetic field. If two magnetometers are used, the two magnetometers 320 may be aligned to the same axis, but be placed such that one is closer to the signal shaft 205, while the second is placed further away from the signal shaft 205. When the signal shaft 205 moves, the closer magnetometer is able to detect the change in the magnetic field of the magnet 206 attached to the signal shaft 205. The further magnetometer may be placed such that it does not pick up the magnetic field of the magnet 206 on the signal shaft, and only records the magnetic field of the earth. The difference between the signals from the two magnetometers 320 represents the magnetic changes due only to the movement of the signal shaft 205. The magnitude of the displacement of the signal shaft 205 can be calculated based on the change of the magnetic field. In another embodiment, or in combination with the magnetometer 320, other types of linear position sensors may be used to measure axial motion of the signal shaft 205. For example, a linear variable differential transformer (LVDT) may be used. With an LVDT, a series of coils is used to measure the movement of a magnetic core that is able to move within the coils. The movement of the magnetic core induces a voltage change that may be measured and associated with the core's linear displacement.

When the signal shaft 205 moves and creates a restriction at the bottom of the tool, the pressure pulse that propagates to the surface is finally generated. The pressure pulse that is generated by the signal shaft 205 is measured by the bore pressure sensor 305. Both the shape and the height of the pressure pulse may be measured by the bore pressure sensor 305.

At 425, the pulser driver 201 de-energizes the solenoid. This is sensed by the sense circuit 310, which then begins the process to cause the circuitry to sleep again, until the next actuation. As shown at 455, the wake circuitry 340 may allow the sensors to continue recording for a predetermined period of time, such as 250 ms, before causing the lower end components to go to sleep at 460. The predetermined period of time preferably is chosen to allow for the closure of the pilot valve and the retraction of the signal shaft to be measured. At 430, the pilot valve closes, and, at 435, the signal shaft 205 retracts. Around this time, many of the components of the smart lower end 300 may return to sleep, as shown at 460, until the start of the next pressure pulse. In another embodiment, the sleep state can be triggered after the signal shaft magnetometers 320 detect that the signal shaft 205 has retracted, as shown at 435.

In this way, many of the failures that can occur with pressure pulse generation can be identified and isolated to a single component in the pulser. If the solenoid 202 fails to actuate, then wake circuitry 340 will never be triggered. The wake circuitry 340 not triggering can be correlated with data from the pulser driver 201 to detect and identify solenoid actuation failures. If the solenoid 202 actuates, but the pilot valve does not move, then the plenum sensor 325 will not pick up any plenum pressure differential. Additionally, the pressure pulse will not be generated, so the bore pressure sensor 305 will not detect any pressure pulse generation. If the signal shaft 205 is blocked from complete movement, the magnitude of the displacement of the signal shaft 205, as calculated by the change in the magnetic field seen at the signal shaft magnetometers 320, will be less than the full possible displacement of the signal shaft 205. Additionally, the shape and/or height of the pressure pulse can be measured using the bore pressure sensor 305. The motion of the signal shaft 205 may also degrade or lessen if the pilot valve is clogged.

Figure 5A:
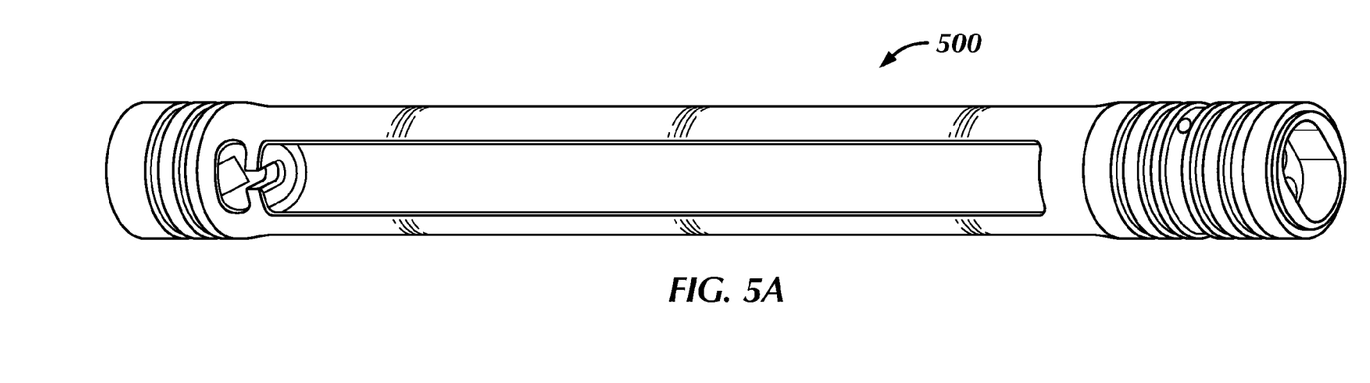
FIGS. 5A-5D show an exemplary embodiment of an electronics chassis for the smart lower end.
Figure 5B:
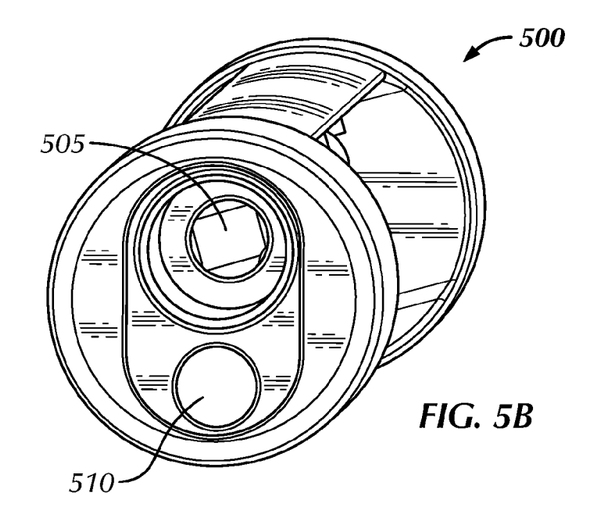

FIGS. 5A-5D show an exemplary embodiment of a chassis 500 for the electronics of smart lower end 204. Due to mechanical constraints relating to the size and operation of the smart lower end 204, the sensing elements of the smart lower end 204 are preferably located below the pulser solenoid 202, although other arrangements are possible. To house the necessary electronics and sensors for the smart lower end 204, the pressure barrel connecting the orifice and the plenum for a standard pulser 200 is extended. The chassis 500, as shown in FIG. 5A, is then inserted into the pulser 200. The chassis 500 both extends and diverts the orifice channel 510 off center, as shown in FIG. 5B, to increase usable space for a board, sensor, and battery mounting. To minimize changes in the fluid dynamics, the flow preferably is not constricted beyond the pilot orifice size.

Figure 5C:
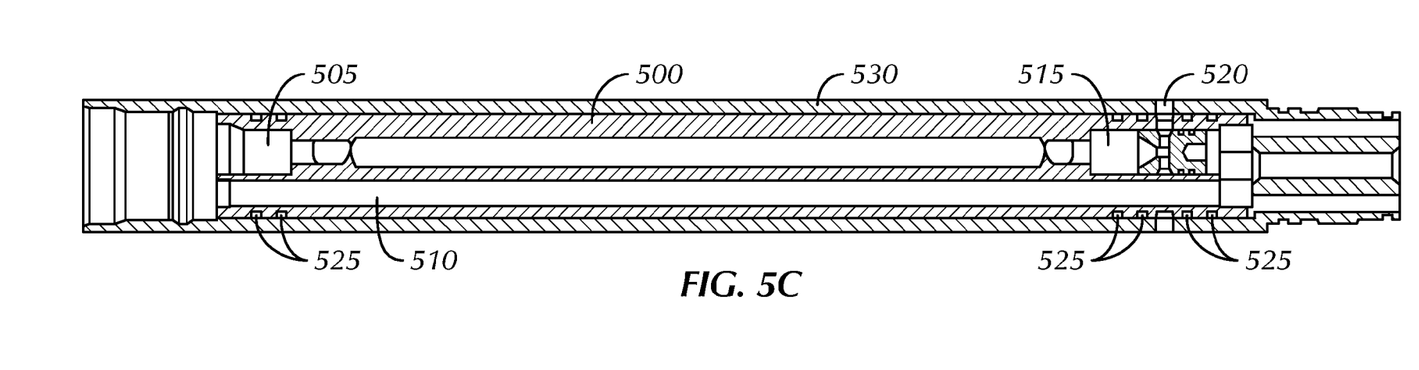
Figure 5D:
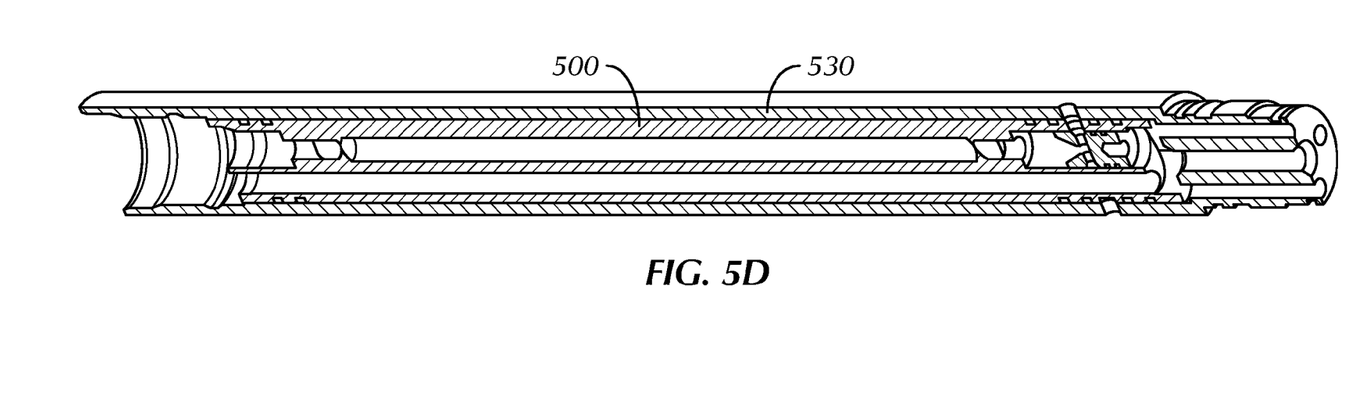

FIG. 5B shows the mounting of the plenum sensor 505 in the chassis 500. Once the pilot valve has fully actuated and the signal shaft 205 has closed the orifice, the pressure pulse should have been generated and the external bore pressure sensor 515 can be used to verify the pulse generation. The external bore pressure sensor 515 is shown in FIG. 5C, which shows the chassis 500 within housing 530. As seen in FIG. 5C, the pressure barrel of the pulser 200 has a series of holes 525 to allow external pressure to contact the bore pressure sensor 515, while the double O-rings 525 on either side maintain the integrity of the internal pressure of the electronics chassis 500 within housing 530. The pressure sensor O-ring seals 525 may be rated to withstand pressures above those typically seen downhole, such as 20 ksi, to provide sealing from the bore pressure to the electronics chassis 500.

As noted above, due to the location of the smart lower end 204 in the MWD string, there may not be access to the MWD battery packs. The assembly preferably includes a dedicated battery pack, and the sensing circuitry operates at extremely low power. The chassis 500 accommodates the mounting space for the electronics board and the mounting space for batteries. An exemplary size for the entire assembly is approximately 15 inches long and will easily integrate into current tool designs through standard barrel connections. Finally, minor modifications may be made to a standard signal shaft 205 to accommodate a magnet.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

What is claimed is:

1. A pulser to generate pressure pulses for mud telemetry, the pulser comprising:
    a hydraulically actuated valve that restricts flow and creates pressure spikes caused by a pressure difference;
    a pilot valve that controls the actuation of the hydraulically actuated valve;
    a signal shaft comprising a magnet, the signal shaft configured to move axially due to the pressure difference; and
    a linear position sensor configured to measure axial movement of the signal shaft,
    wherein the linear position sensor is a magnetometer configured to measure a change in magnetic field, wherein the change in magnetic field is caused by movement of the signal shaft magnet.

2. The pulser of claim 1, further comprising a microcontroller and a memory, wherein the microcontroller is configured to input data from the magnetometer and store the data in the memory.

3. The pulser of claim 2, wherein the microcontroller is configured to calculate a displacement of the signal shaft based on the change in magnetic field.

4. The pulser of claim 1, wherein the magnetometer comprises two magnetometers, wherein one magnetometer is not able to sense the magnetic field change caused by the movement of the magnet on the signal shaft.

5. The pulser of claim 4, wherein the difference in signals from the two magnetometers compensates for a change in the magnetic field not caused by the movement of the signal shaft.

6. The pulser of claim 1, wherein the linear position sensor is a linear variable differential transformer configured to sense movement of the signal shaft magnet.

7. The pulser of claim 1, further comprising a plenum pressure sensor configured to measure plenum pressure within the pulser.

8. The pulser of claim 1, further comprising a bore pressure sensor configured to measure bore pressure external to the pulser.

9. The pulser of claim 1, further comprising a solenoid configured to actuate the pilot valve.

10. The pulser of claim 9, further comprising a pulser driver configured to energize the solenoid.

11. The pulser of claim 10, further comprising a solenoid sense circuit, the solenoid sense circuit configured to sense the actuation of the solenoid.

12. The pulser of claim 11, wherein the solenoid sense circuit is a passive pick up coil.

13. The pulser of claim 11, further comprising wake circuitry, the wake circuitry configured to wake other components of the pulser after the sense circuit senses the actuation of the solenoid.

14. The pulser of claim 13, wherein the wake circuitry is further configured to cause other components of the pulser to enter a low power state after the sense circuit does not sense the solenoid.

15. The pulser of claim 14, wherein the wake circuitry is configured to cause other components of the pulser to enter a low power state after a predetermined period of time after the sense circuit does not sense the solenoid.

16. The pulser of claim 1, further comprising a motor configured to actuate the pilot valve.

17. A method of confirming the operation of a hydraulically actuated valve in a pulser, the method comprising:
measuring a change in magnetic field using a linear position sensor, wherein the change in magnetic field is caused by axial movement of a magnet attached to a signal shaft that causes a hydraulically actuated valve to restrict flow and create pressure spikes.

18. The method of claim 17, further comprising:
calculating a displacement of the signal shaft based on the change in magnetic field.

19. The method of claim 17, further comprising:
measuring plenum pressure within the pulser using a plenum pressure sensor; and
measuring bore pressure external to the pulser using a bore pressure sensor.

20. The method of claim 19, further comprising:
sensing, using a solenoid sense circuit, a magnetic field generated by the actuation of a solenoid.

21. The method of claim 20, further comprising:
activating the plenum pressure sensor after sensing a magnetic field by the solenoid sense circuit;
activating the magnetometer after sensing a magnetic field by the solenoid sense circuit; and
activating the bore pressure sensor after sensing a magnetic field by the solenoid sense circuit.

22. The method of claim 21, further comprising:
sensing, using the solenoid sense circuit, the absence of a magnetic field;
deactivating the plenum pressure sensor after sensing the absence of a magnetic field;
deactivating the magnetometer after sensing the absence of a magnetic field; and
deactivating the bore pressure sensor after sensing the absence of a magnetic field.

23. The method of claim 22, further comprising waiting for a predetermined period of time before deactivating the plenum pressure sensor, the magnetometer, and the bore pressure sensor.

24. The method of claim 21, further comprising:
deactivating the plenum pressure sensor after sensing a change in magnetic field that is caused by movement of the magnet attached to the signal shaft;
deactivating the magnetometer after sensing a change in magnetic field that is caused by movement of the magnet attached to the signal shaft; and
deactivating the bore pressure sensor after sensing a change in magnetic field that is caused by movement of the magnet attached to the signal shaft.

25. The method of claim 19, further comprising storing data from the plenum pressure sensor, the bore pressure sensor, and the magnetometer in a memory.

26. The method of claim 17, further comprising storing data from the magnetometer in a memory.

27. A non-transitory computer readable medium comprising computer executable instructions stored thereon configured to cause one or more processing units located within a pulser to:
measure a change in magnetic field using a magnetometer, wherein the change in magnetic field is caused by axial movement of a magnet attached to a signal shaft that causes a hydraulically actuated valve to restrict flow and create pressure spikes.

28. The non-transitory computer readable medium of claim 27, further comprising instructions to cause the one or more processing units to:
measure plenum pressure within the pulser using a plenum pressure sensor, wherein the pressure difference is caused by movement of a pilot valve; and
measure bore pressure external to the pulser using a bore pressure sensor, wherein pressure change is caused by a pressure pulse generated by the signal shaft.

29. The non-transitory computer readable medium of claim 28, further comprising instructions to cause the one or more processing units to:
activate the plenum pressure sensor after sensing a magnetic field by the solenoid sense circuit;
activate the magnetometer after sensing a magnetic field by the solenoid sense circuit; and
activate the bore pressure sensor after sensing a magnetic field by the solenoid sense circuit.

* * * * *